(12) United States Patent
Harvey

(10) Patent No.: US 10,324,607 B2
(45) Date of Patent: Jun. 18, 2019

(54) MESSAGE RIBBON USER INTERFACE FOR PRESENTING REAL-TIME INFORMATION AND ALLOWING USER-SELECTED REDIRECTION WITHIN A COMPUTER PROGRAM

(71) Applicant: Hexagon Technology Center GmbH, Heerbrugg (CH)

(72) Inventor: Keith D. Harvey, Huntsville, AL (US)

(73) Assignee: Hexagon Technology Center GMBH, Heerbrugg (CH)

( * ) Notice: Subject to any disclaimer, the term of this patent is extended or adjusted under 35 U.S.C. 154(b) by 336 days.

(21) Appl. No.: 14/869,488

(22) Filed: Sep. 29, 2015

(65) Prior Publication Data

US 2017/0090737 A1  Mar. 30, 2017

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/0483* (2013.01);
(Continued)

(58) Field of Classification Search
CPC .. G06F 3/0481; G06F 3/04817; G06F 3/0482; G06F 3/0484; G06F 3/04842;
(Continued)

(56) References Cited

U.S. PATENT DOCUMENTS 5,617,526 A    4/1997  Oran et al. .................... 395/326
5,673,404 A *  9/1997  Cousins ................ G06F 3/0481
                                                      715/772

(Continued)

FOREIGN PATENT DOCUMENTS

WO     WO 03/048914 A2    6/2003    ............... G06F 3/00

OTHER PUBLICATIONS

Notification of Transmittal of the International Search Report and the Written Opinion of the International Searching Authority, or the Declaration, PCT/US2016/040439, 12 pages, dated Sep. 23, 2016.

*Primary Examiner* — Claudia Dragoescu
(74) *Attorney, Agent, or Firm* — Nutter McClennen & Fish LLP

(57) ABSTRACT

A computer program product produces a non-modal graphical user control element as part of a ribbon for use within an application program providing real-time status information about the application program. The computer code comprises computer code for producing the non-modal graphical user control element on a ribbon graphically displayed within the application program. Additionally, the computer code includes computer code for receiving from the application program a status message of a predefined category and visually placing the status message on the non-modal graphical user control element. Application specific position information associated with the status message is received and responsive to user selection of the graphical user control element the application program switches to computer code associated with the application specific position information.

23 Claims, 13 Drawing Sheets

(51) Int. Cl.

| | | |
|---|---|---|
| *G06F 9/451* | (2018.01) | |
| *G06F 3/0481* | (2013.01) | |
| *G06F 3/0482* | (2013.01) | |
| *G06F 3/0483* | (2013.01) | |
| *G06F 11/30* | (2006.01) | |
| *G06F 11/32* | (2006.01) | |
| *H04L 29/08* | (2006.01) | |
| *H04L 29/06* | (2006.01) | |
| *G06F 9/54* | (2006.01) | |
| *G06Q 10/10* | (2012.01) | |
| *H04L 12/18* | (2006.01) | |
| *G06F 8/38* | (2018.01) | |

(52) U.S. Cl.
CPC ........ *G06F 3/0484* (2013.01); *G06F 3/04817* (2013.01); *G06F 8/38* (2013.01); *G06F 9/451* (2018.02); *G06F 9/542* (2013.01); *G06F 11/302* (2013.01); *G06F 11/321* (2013.01); *G06Q 10/103* (2013.01); *H04L 12/1895* (2013.01); *H04L 67/36* (2013.01); *H04L 67/42* (2013.01); *G06T 2219/024* (2013.01)

(58) Field of Classification Search
CPC ........ G06F 9/451; G06F 9/542; G06F 11/302; G06F 11/321
See application file for complete search history.

(56) References Cited

U.S. PATENT DOCUMENTS

| | | | |
|---|---|---|---|
| 2002/0051017 A1 | 5/2002 | Wishoff | 345/774 |
| 2002/0091700 A1* | 7/2002 | Steele | G06F 17/30958 |
| 2004/0098462 A1 | 5/2004 | Horvitz et al. | 709/207 |
| 2007/0192689 A1 | 8/2007 | Johnson et al. | 715/700 |
| 2007/0264956 A1 | 11/2007 | Bicker et al. | 455/186.1 |
| 2009/0249247 A1* | 10/2009 | Tseng | H04M 1/72552 |
| | | | 715/808 |
| 2012/0084707 A1* | 4/2012 | Abdel-Kader | H04M 1/2745 |
| | | | 715/779 |
| 2012/0204191 A1* | 8/2012 | Shia | G06Q 10/10 |
| | | | 719/318 |

\* cited by examiner

FIG. 7C

PRODUCT NAME

| File | Command tab1 | Command tab2 | Command tab3 | Command tab4 |

User Name    INTERGRAPH

Item One

Your email address*
frank@com

Confirm email address*
fran@foo.com

Error Message   < 2/6 >   X

These fields do not match and must be a valid email address. These fields do not match and must be a valid email address. These fields do not match and must be a valid email address. These fields do not match and must be a valid email address Item Two
Item Three
Item Four One | Two | Three | Four

*FIG. 8*

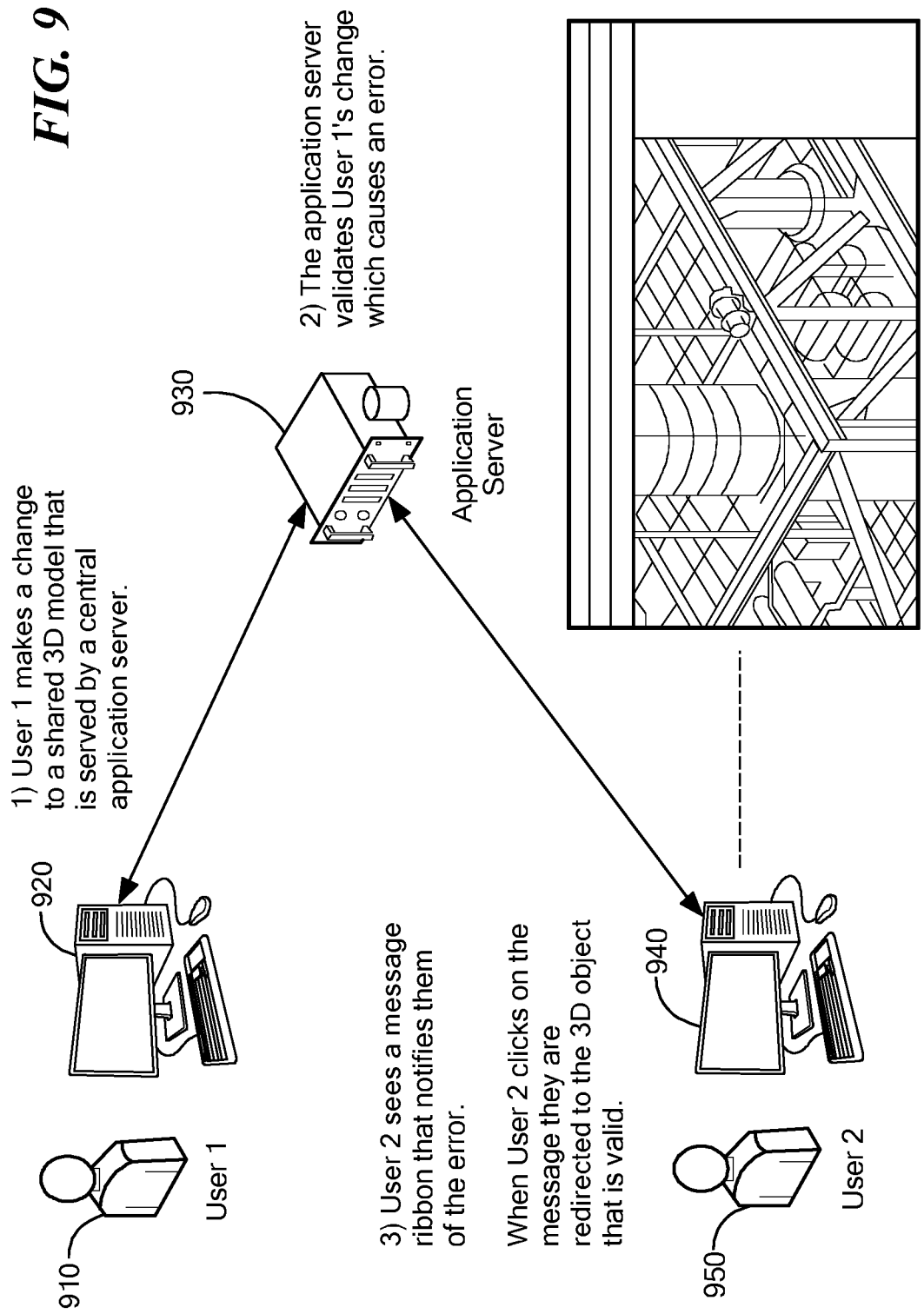

MESSAGE RIBBON USER INTERFACE FOR PRESENTING REAL-TIME INFORMATION AND ALLOWING USER-SELECTED REDIRECTION WITHIN A COMPUTER PROGRAM

TECHNICAL FIELD

The present invention relates to messaging within an active computer application, and more particularly to message ribbons with user-selectable program redirection.

BACKGROUND ART

Traditionally, complex computer programs may include a messaging system to inform users of the computer program of a change in status such as an error, warning, or informational message. Some examples of complex computer programs include 3-D CAD programs, multi-user computer-programming environments, or any other computer program that involves multiple users and collaboration on a project or workflow. In complex computing environment in which multiple users of the computer program are working on a common project, one user's actions may impact another user's actions and this information needs to be transmitted to one or more other users that may simultaneously be working on the project.

Such complex computer programs rely on modal messaging as shown in FIG. 1. Upon the occurrence of a trigger that generates a message, the message is distributed through the computer program's environment to each user of the computer program that is operating on the project for which the workflow is generated. These communications interrupt the workflow of the user, through the creation of a new window, or pop-up that requires user interaction. This distribution system is quite effective in preventing errors from propagating through a project, however, the larger the project and the number of users, the more often that users are interrupted from their workflow and forced to engage with the modal messaging system.

One can imagine working on a large-scale government construction project, where warnings and error messages would constantly appear on the computer screen during a user's workflow and interrupt the user's workflow where the particular message does not require the user's immediate attention. For example, a warning message concerning a problem with plumbing within a building under construction, may have little to no immediate significance on a user's workflow that is addressing the electrical system. The user may be capable of carrying on with the workflow without a fatal error occurring.

SUMMARY OF THE EMBODIMENTS

In accordance with one embodiment of the invention, a computer program product having a non-transitory computer readable medium with computer code thereon for use with a computer processor for producing a non-modal graphical user control element as part of a ribbon for use within an application program providing real-time status information about the application program is described. The computer code comprises computer code for producing the non-modal graphical user control element on a ribbon graphically displayed within the application program;

computer code for receiving from the application program a status message of a predefined category and visually placing the status message in real-time on the non-modal graphical user control element at a location associated with the predefined category;

computer code for receiving application specific position information associated with the status message; and computer code responsive to user selection of the non-modal graphical user control element at the location for the predefined category causing the application program to switch to code associated with the application specific position information.

In certain embodiments of the invention, the application specific position information may be identification of an object within the application program that generated the status message. In other embodiments of the invention, the causing of the application program to switch to code associated with the application specific position information further causes the presentation of a graphical user interface associated with application specific position information.

The application specific position information may be identification of a parameter associated with one of a plurality of graphical user interfaces within the application program. The computer program may include computer code for producing a second non-modal graphical user control element within the application program for a second predefined category wherein the first and the second non-modal graphical user control elements form a ribbon. In certain embodiments, the real-time status information is indicative of an error or a warning within the application program, but does not stop execution of the application program. Further, upon receiving a second real-time status message within a predefined category, a new graphical user control element is visually presented stacked on the first real-time status message within the predefined category.

Embodiments of the invention may further include computer code responsive to user interaction for moving between stacked status messages within the predefined category. In some embodiments, the status message is removed from the non-modal graphical user control element after a predefined time period or after occurrence of an event in the application.

In embodiments of the invention, the application can be a complex computer program having a plurality of projects associated with project data and the computer program product further includes computer code for identifying the status message according to a project and only displaying status messages related to a the activity if a user is working on the project. The status messages may fall into one of a plurality of categories including: an error message, a warning message, a success message, or an instruction message. An error message indicates that an error in the application program has already occurred and may be indicative of a data validation error. The message ribbon allows the user to select a message and to be redirected within the computer code. For example, the user may be redirected to a graphical user interface different than the presently presented graphical user interface. This new graphical user interface that is associated with the message will allow a user to take one or more actions associated with the message. Additionally, upon user selection of the message ribbon and redirection, the user may be provided with additional information or a separate computer program, script or add on-module. The additional information may include instructions about what error exists and how to correct the error.

Embodiments of the invention may operate on a single computer or may operate in a distributed environment, such as a client server environment. In a client server configuration, a portion of the application program would be served by the server to the client device allowing a user to input and transmit data/information to the server wherein the remainder of the application program is operational. Additionally, in such a configuration, the server will have access to one or more projects that may be shared by a plurality of users and worked on through workflows simultaneously.

BRIEF DESCRIPTION OF THE DRAWINGS

The foregoing features of embodiments will be more readily understood by reference to the following detailed description, taken with reference to the accompanying drawings, in which:

FIG. 3A is an exemplary screen shot of a work flow;

FIG. 3B is an exemplary screen shot of a work flow where the user is presented with a graphical user interface for entering information related to an order;

FIG. 3C shows an exemplary screen shot of the graphical user interface after the user has used an input device and has selected the error message in the message ribbon;

FIGS. 7A-7C show an example of the message ribbon.

FIG. 7A shows an exemplary message ribbon wherein the message ribbon includes multiple icons for different message types wherein each icon includes a counter for the number of that type of messages;

FIG. 7B shows an exemplary message ribbon where a user selects an error message to interact with;

FIG. 7C shows a message ribbon that redirects the user to an input screen in which a confirmatory e-mail address does not match with the originally entered e-mail address;

FIG. 8 shows an exemplary screen from a computer program wherein the message ribbon has redirected the user the graphical user interface associated with the error message in accordance with FIG. 7C; and FIG. 9 shows an exemplary computer system with distribution of a message to a plurality of users of a complex computer program based upon the generation of a message by a message object.

DETAILED DESCRIPTION OF SPECIFIC EMBODIMENTS

Definitions

As used in this description and the accompanying claims, the following terms shall have the meanings indicated, unless the context otherwise requires:

A "complex computer program" is a computer program that is used by a plurality of uses that may simultaneously work on a data set (e.g. CAD diagrams, computer program coding blocks, system plans (construction documents), VLSI (very large scale integration) to develop a project.

A "workflow" is a pattern of activity performed on a project enabled by the systematic organization of computer resources into processes. A project is composed of multiple workflows that result in a finished product wherein the finished product may be represented by data. For example, a 3-D CAD diagram, a set of digital blue prints, computer software program etc. may be a product that results from a project.

A "ribbon" is a toolbar or other graphical interface that graphically appears within an executing computer program. A ribbon resides on a small subset of the screen as compared to the displayed computer program. Thus, a ribbon would occupy a fraction of the display during operation of the executing computer program.

A "graphical control element" is a graphical icon positioned at a location on a ribbon within a complex computer program that provides status information related to a received message and allows for user selection of the graphical control element causing the complex computer program to be redirected to a new location within the complex computer program associated with the generation of the status message;

A "class" is a data type, and in some computer languages is a superset of interfaces.

An "interface" is a method that a computer program uses to communicate with a number of similar classes, each with different semantics. An interface provides a common base for accessing a number of similarly-behaving objects. Generally, an interface will have at least one abstract method.

A "contract" represents how to use a function/class/interface, and isn't generally fully representable in any language. It is an implicit agreement for a class or interface, such as preconditions and post conditions. The specification for a return value or an argument can also be part of a contract.

An "object" is an instance of a class type.

Figure 1:
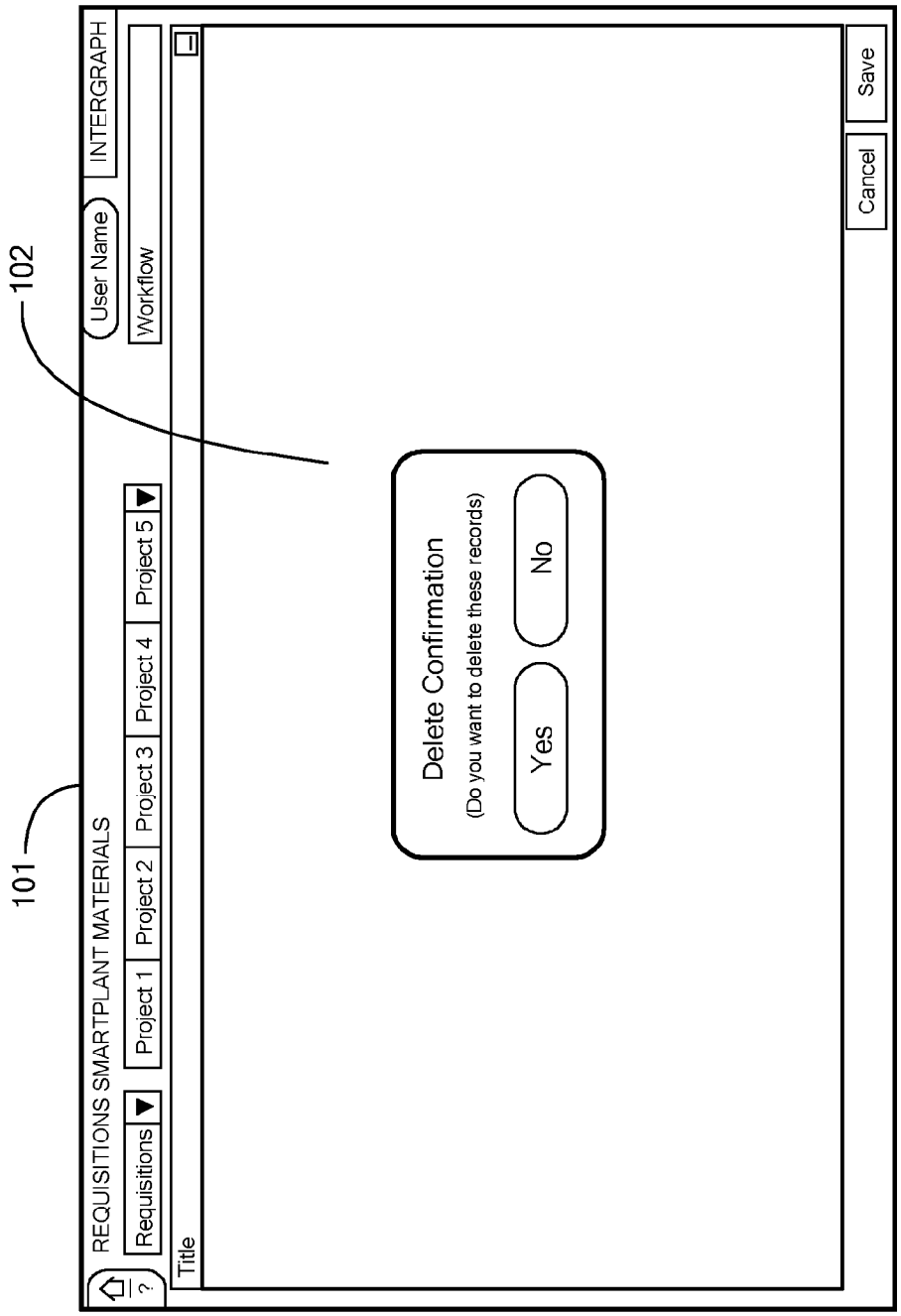
FIG. 1 shows an exemplary environment in which embodiments of the present invention may be implemented.
Figure 2:
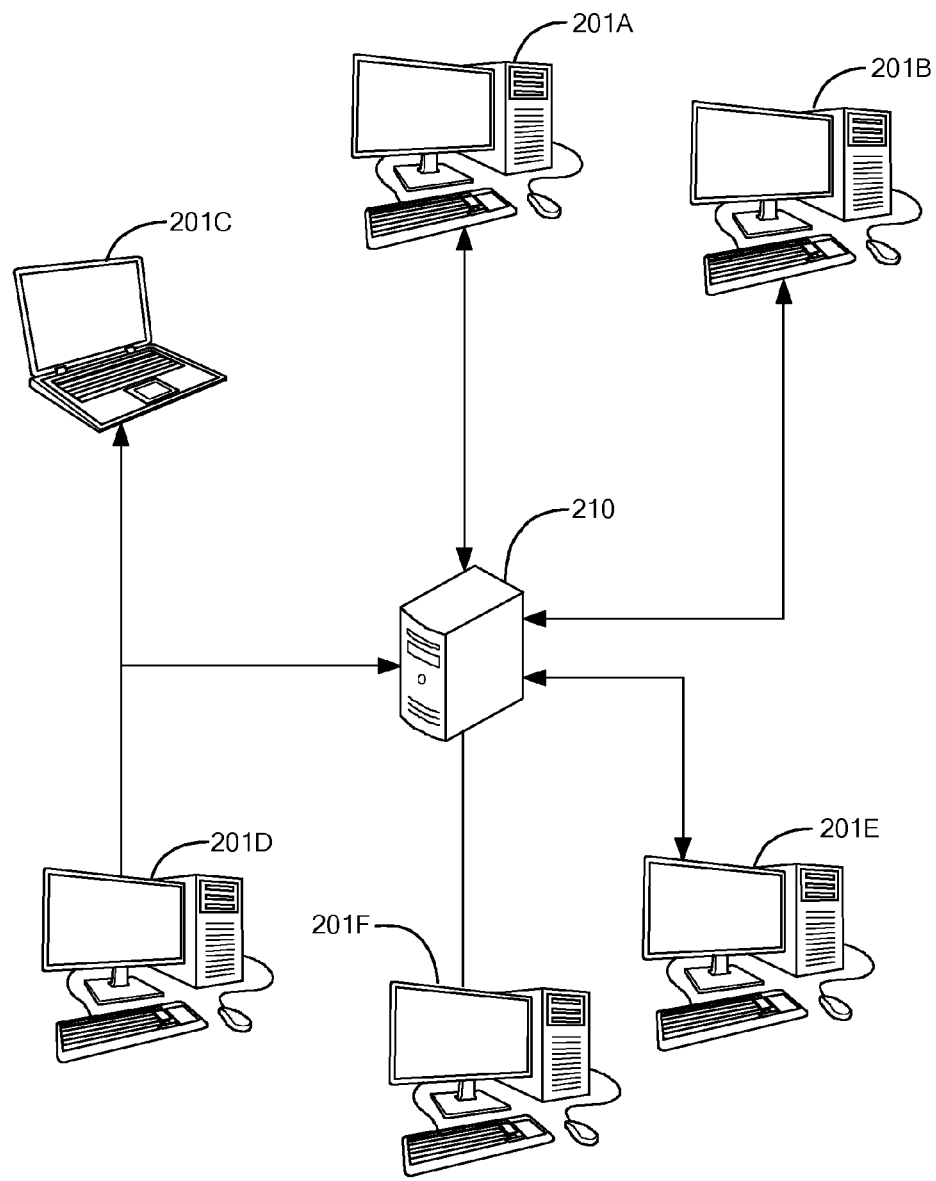
FIG. 2 shows an exemplary user workflow in a complex computer program.

FIG. 2 shows an exemplary environment in which embodiments of the present invention may be implemented. The environment includes one or more servers 210 and networked computers 201A-F that implement a complex computer program. The server stores information related to one or more projects and provides an organized set of services for user workflows for implementing defined portions of the project using a complex computer program. A user of the system may log-in to the server 210 through a networked computer 201A-F, enter account information, and be provided with access to a portion of the complex computer program for implementing a workflow. Embodiments of the present invention include a message ribbon that provides status/messages to a user of the complex computer program in a non-disruptive manner without requiring the complex computer program to be stopped on the networked computing device of one or more users. The message ribbon is an integral part of the complex computer program and is not a secondary application. All communications between the message ribbon and the complex computer program occur internal to the complex computer program within the message stack.

The message ribbon can be designed to occupy a minimal amount of the display screen for the computer program, so as to allow a user to continue operation of a workflow within the computer program while still being informed that a message has been sent and received by the message ribbon. Although, the present invention is applicable to complex computer programs that have different users, the message ribbon may be used in regular computer programs. For example, a message ribbon may be used with a presented web page wherein the web page may generate error messages associated with data validation (e.g. a user enters dd/mm/yyyy whereas the proper data format is mm/dd/yyyy). In such a context, the error message would be generated and the message icon in the message ribbon would indicate that an error message has been received by adding to the counter, but would not prevent the user from entering additional information in other parts of the form. The user can then click on the icon for the error message and be directed to the location in the graphical user interface for the computer program associated with the message (i.e. directed to the portion of the form being filled out indicating that the wrong format for the date has been inserted.). The user may be provided with additional information as part of the message ribbon computer code that instructs the user how to fix an error that is associated with the message.

Figure 3A:
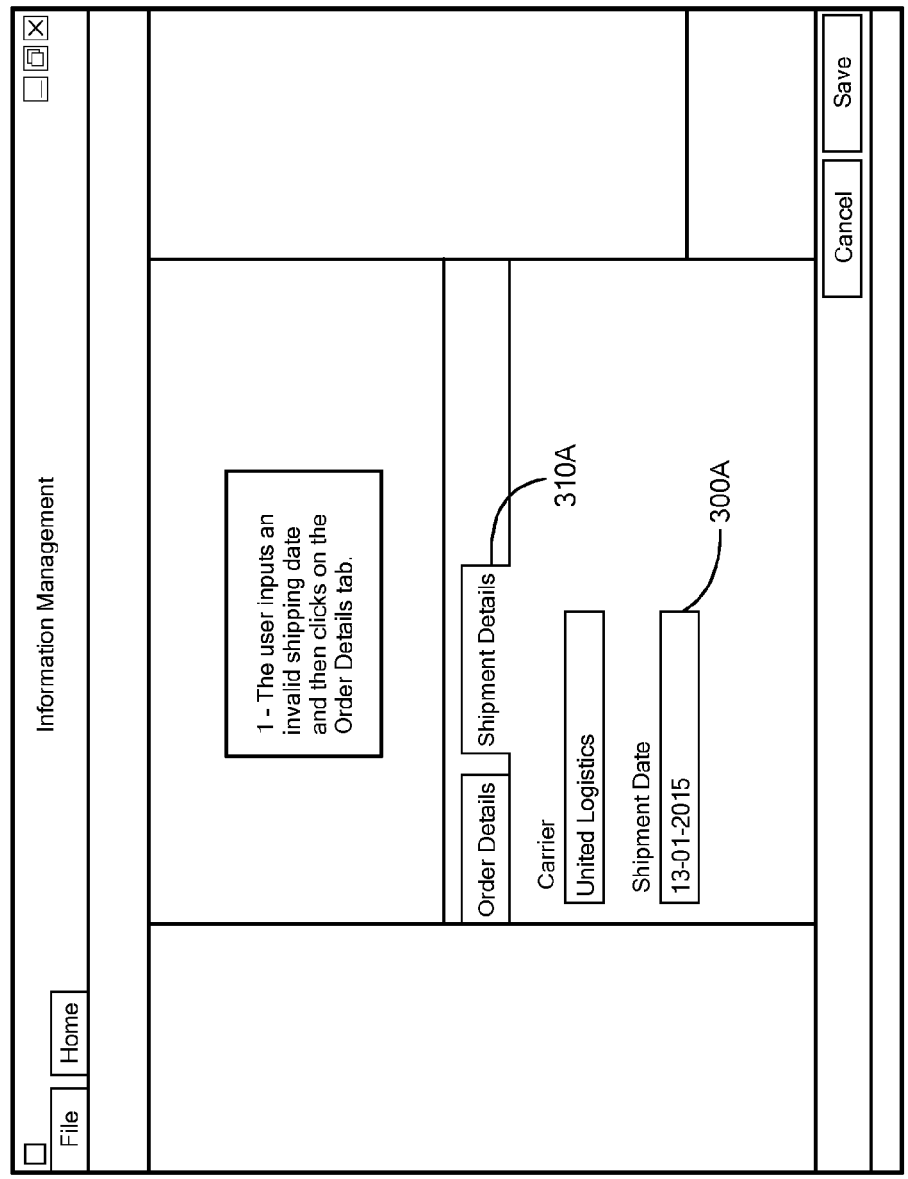
FIGS. 3A-C shows an exemplary message ribbon for notifying a user within a workflow of one or more messages without requiring the user to interact with the message while allowing the user to selectively interact with the message and be redirected within the computer program to the location within the computer program from which the message was generated.
Figure 3B:
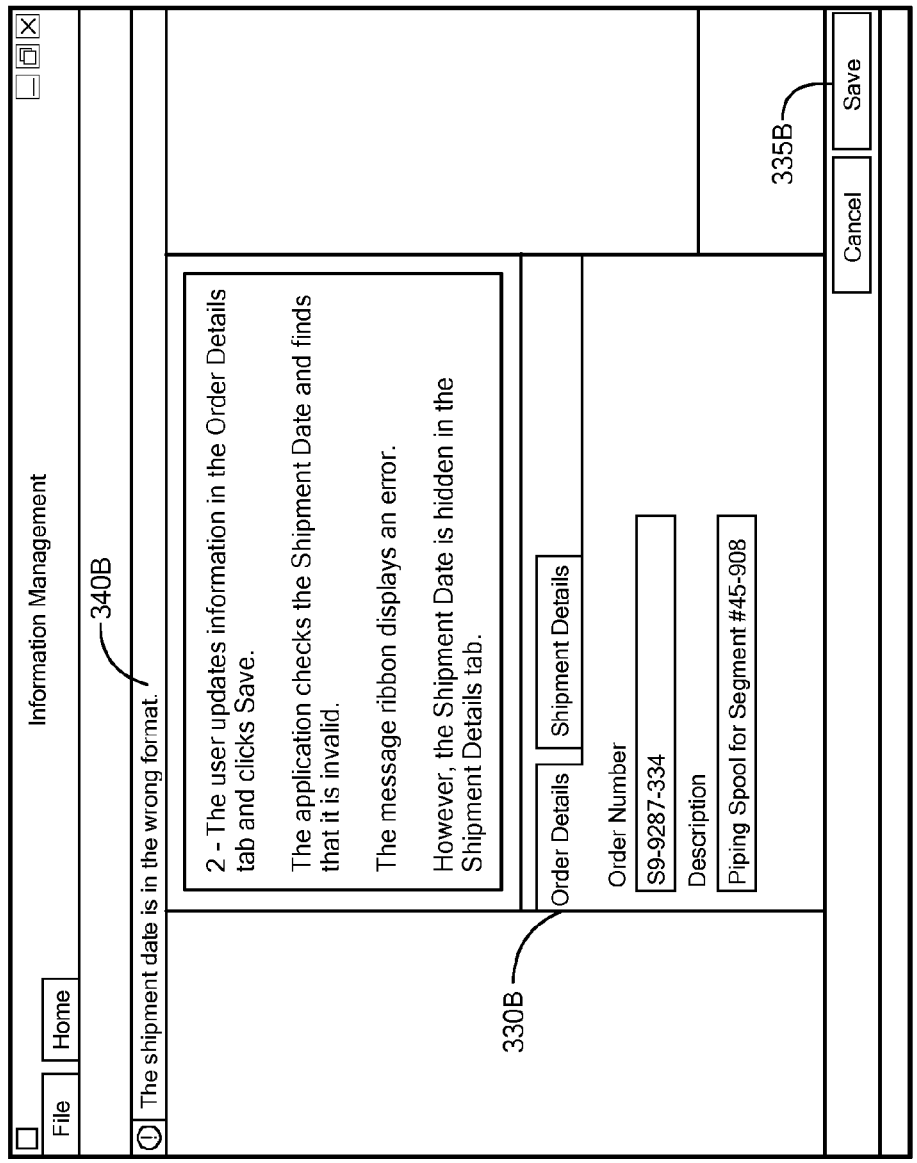
Figure 3C:
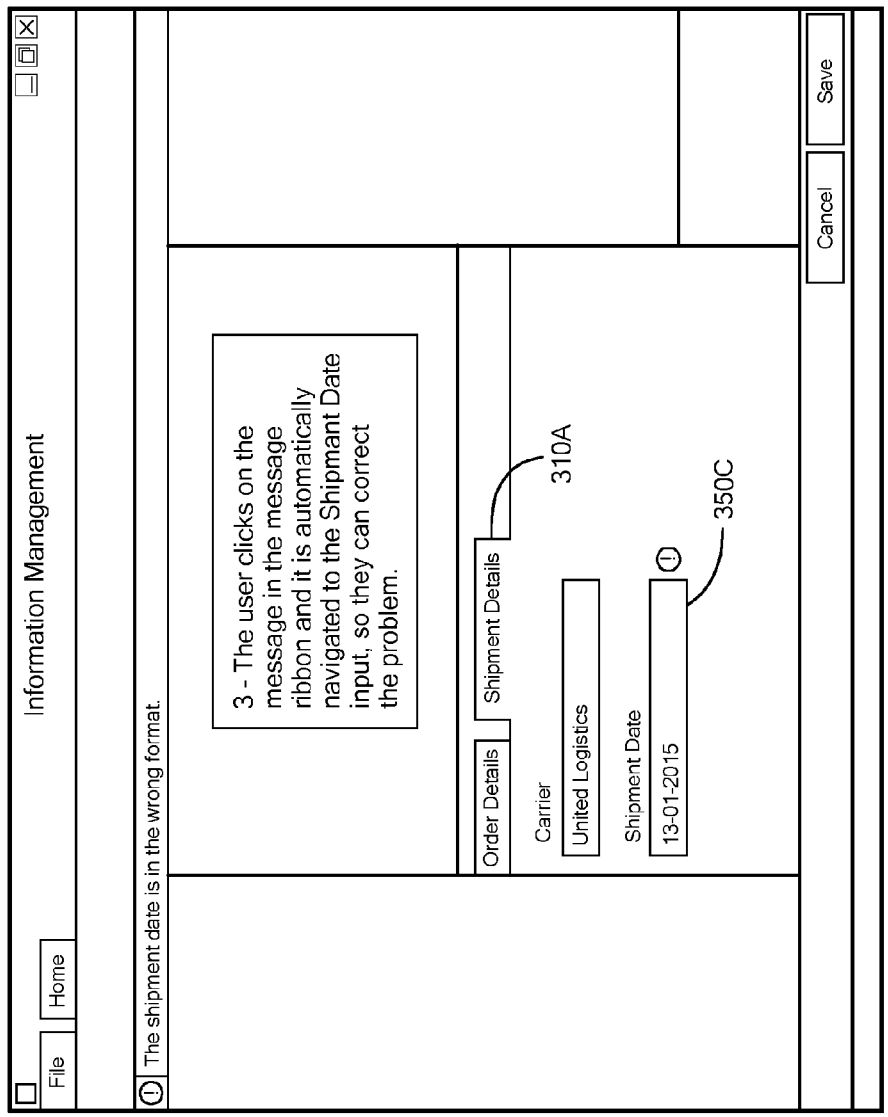

FIGS. 3A-C show an exemplary user workflow in a complex computer program. In FIG. 3A an exemplary screen shot of a workflow is presented. The user is presented with an input screen and is present on the shipping details tab 310A. The user inputs an invalid shipping date into the shipping date entry box 300A. In FIG. 3B, the user has selected the order details tab 330B and is presented with a graphical user interface for the order details. The user then updates information in the order details tab and uses an input device to select save 335B. The application checks the shipment date either locally on the client device or by sending the saved data to a server where the data is passed through a date checking algorithm. The date checking algorithm determines that the shipment date is invalid. An error message is generated and the error message is presented on the message ribbon 340B. The shipment date is not presented on the presented graphical user interface and is hidden from view of the user in the shipment details tab. FIG. 3C shows the graphical user interface after the user has used an input device and has selected the error message in the message ribbon. The computer program is redirected to the graphical user interface associated with the generation of the error message, which is the shipment details tab graphical user interface 310A as shown. The user can then correct the problem, by replacing the date information with valid date information. The computer code may compare the entered information to actual calendar data and may further compare the entered information to a list of criteria. For example, a shipping date may never be on a Sunday. The user may even be presented with highlighting or other indicia of the location within the graphical user interface that requires correction 350C. Additionally, the user may be provided with additional information regarding the error that generated the message and how to correct the error. In other embodiments of the invention, upon selection of the message ribbon, another computer program, add-on module or script may be launched that can assist the user in relation to the generated message.

Figure 4:
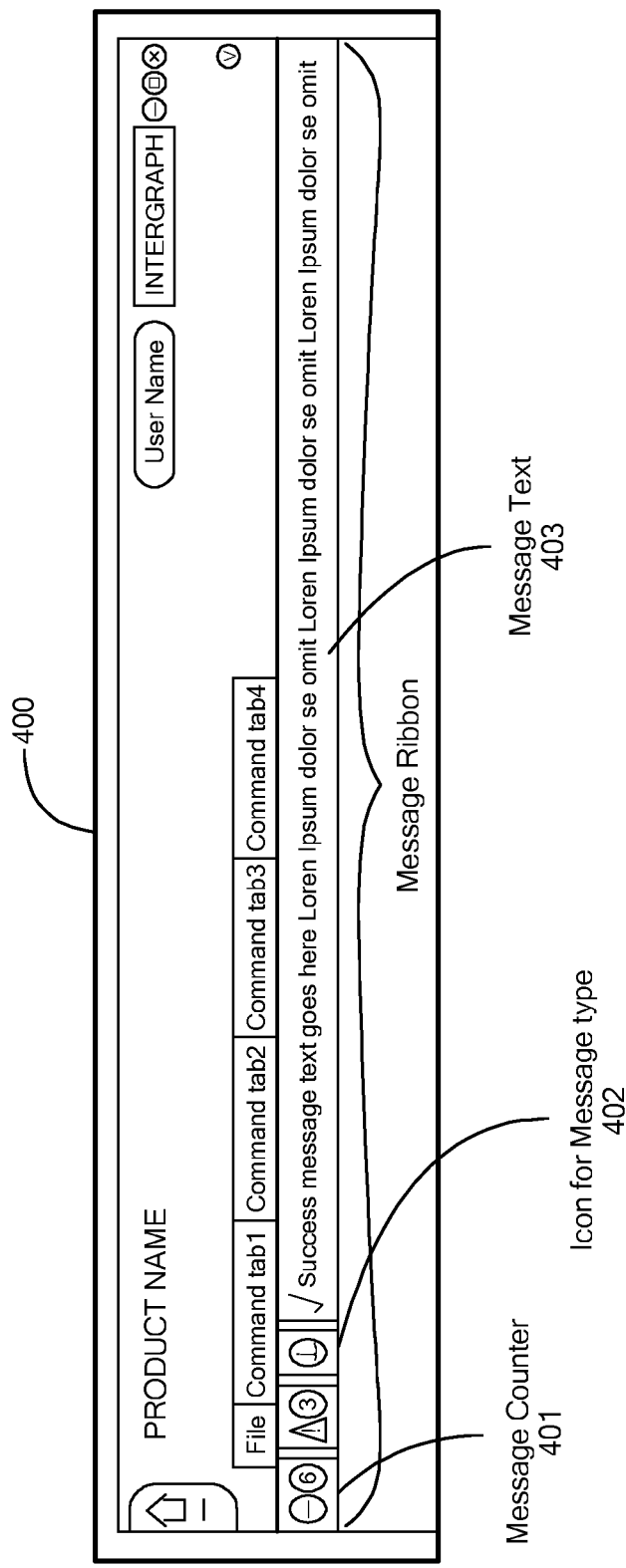
FIG. 4 shows an exemplary message ribbon having a message box and including a plurality of graphical control elements for selecting between different message types.

FIG. 4 shows an exemplary message ribbon 400 for notifying a user within a workflow within a complex computer program of one or more messages without requiring the user to interact with the message while allowing the user to selectively interact with the message and be redirected within the computer program to the location within the computer program from which the message was generated. As shown, the message ribbon is a toolbar that provides real-time status information including a message counter 401. The message counter allows messages of a same type to be stacked on top of one another and to allow the user to know the number of messages of a particular type that have not been reviewed. In FIG. 4 there are three message counters for different message types as represented by different message icons 402. Further, the message ribbon includes a text space for presenting the most recently received message. In certain embodiments, the text space only becomes active when a user of the complex computer program interacts with the message ribbon and selects one of the different message icons. The selection causes the message ribbon to select and display the most recent or the top message (wherein the messages may be ordered according to some criteria set).

When a message is received by the message ribbon computer software, the message ribbon will place indicia on the received message type icon to indicate that this a new message has been received and the text associated with the message can be placed in the message text section 403. In certain embodiments, the message text section of the message ribbon may be left blank until the user interacts with the message ribbon through an input device such as a cursor. The user may be required to hover the cursor over the desired message type for display of the most recent message of that type in the stack of messages to be displayed in the message text section 403 of the message ribbon.

The message ribbon software is software code that can be added to a computer program to enable presentation of messages to the user that do not require immediate modal interaction. Thus, the user can decide how to proceed with viewing and addressing the messages. As explained in more detail in FIG. 5, a user can interact with the message ribbon and can select a message and can be taken within the computer code to a graphical user input related to the code that generated the message within the complex computer program. Thus, the user can be redirected to where a potential problem may exist within a project. Additionally, the message ribbon software may also direct the user to other computer programs or software modules associated with the computer program that can assist the user with an action associated with the message. For example, as would be understood by one of ordinary skill in the art, a "wizard" program could be launched in response to user selection of a graphical control element associated with a message to guide the user with identifying an error and providing assistance with correcting the error. Other modules or computer programs could likewise be launched. For example, an e-mail application may be executed allowing the user to communicate with another team member for the project that they are working on. In one embodiment, the e-mail application may automatically associate the address of another user that caused the error message to be generated, so that the two co-workers can communicate about the error and make corrections.

Figure 5:
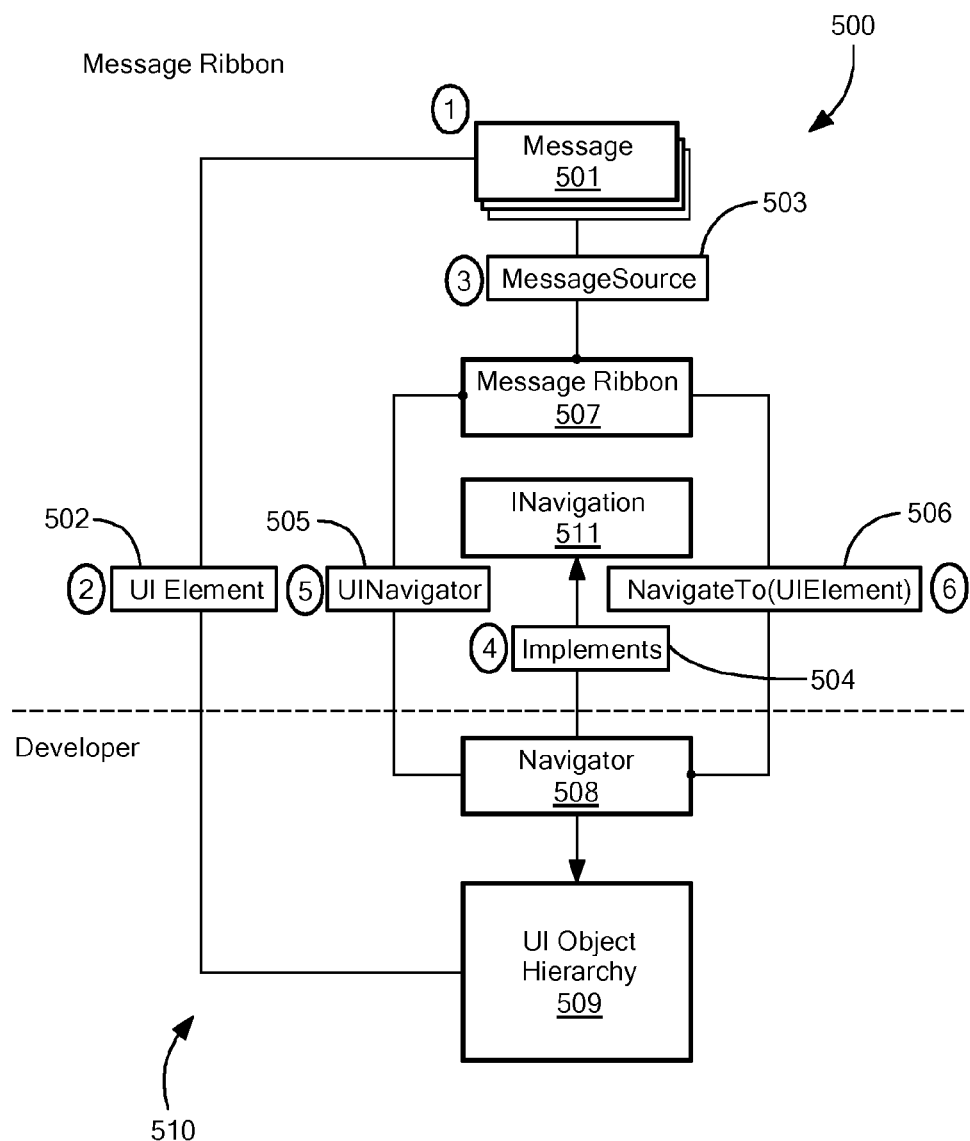
FIG. 5 shows the logical flow of information between the message ribbon and a computer program, such as a complex computer program, along with the respective computing modules that are required for implementation of the message ribbon.

FIG. 5 shows the logical flow of information between the message ribbon computer program 500 and a computer program 510, such as a complex computer program, along with the respective computing modules that are required for implementation of the message ribbon. The message ribbon computer program 500 in some embodiments may be computer code that is added as an add-on module to the computer program 510. The message ribbon computer program includes computing modules, such as objects that represent aspects of the message ribbon. As shown in FIG. 5 a dashed line is present that show the division between the message ribbon computer code 500 and the computer code of the computer program 510 in which the message ribbon program is implemented.

The developer of the computer program includes code within the computer program that generates one or more instances of a message object (501). The message object 501 may communicate different types of information to be provided to and displayed to an end user of the computer program. All of the messages provided in the message ribbon are non-modal messages. An error message that immediately requires user interaction (modal message) would not be part of the message ribbon. The message object may indicate that a non-fatal error has occurred during execution of the computer program. Other message types may include warning messages, success messages, informational messages and instructional message. Each of the message object types will be discussed in more detail below.

The message ribbon computer code 500 receives each message object 501 as the message object 501 is generated by the underlying computer program and uses the contents of the message objects to display the message to the user. Each message object includes a UIElement property 502 that the developer of the computer program can assign a reference, pointer, or static ID to an element in the UI (user interface) Object Hierarchy 509. The message object may provide one or more variables and methods. The UI Object Hierarchy 509 is a data structure that represents the user interfaces for the computer program 510. The user interfaces may be a single graphical user interface or may have a plurality of user interfaces for different sections or events within a computer program. Examples of computer programs that include one or more graphical user interfaces include 3D CAD application, a web browser, a software development tool, the standard Windows OS UI, the standard OSX Apple operating system UI, or Linux UI.

The developer of the computer program assigns each of the Message objects 501 to the MessageRibbon object 507 using the MessageSource property 503. A MessageRibbon control is the container for one or more Message objects. In a simple single-screen user-interface application, only a single MessageRibbon control will be necessary. In a more complex multi-screen application, multiple MessageRibbon controls can be placed on individual windows. The MessageSource property 503 is the property that delivers Message objects 501 to the MessageRibbon control 507. The MessageSource 503 property serves as a two-way communication channel (two-way data binding) to relay changes made to each Message object between the data source and the Message object 501 in the MessageRibbon control 507. This allows the MessageRibbon 507 to organize and display messages to the user. The MessageRibbon object 507 provides an interface class (INavigation) 511 that provides a developer with a contract that they can use to code a Navigator class 508 that understands how to navigate the UI Object Hierarchy 509. The MessageRibbon control can be used in different application with messages associated with different types of data structures. Because of this flexibility, the MessageRibbon computer code 500 give developers an interface(contract) to implement. This contract includes a set of properties and function that the MessageRibbon control 507 uses to navigate to the source of a Message. For example, a developer of a 3D-CAD application can use the MessageRibbon to display warning messages of 3D objects that are colliding with each other. Because the developer uses the INavigation interface, the MessageRibbon can execute the function provided by the developer and at runtime, the user is automatically navigated to the 3D object in the 3D model when the user selects the Message on the MessageRibbon graphical display. The MessageRibbon object may also cause the launching of a computer software module, a script or a separate computer program.

The developer assigns a reference to the Navigator class 508 to the MessageRibbon Object 507 using the UINavigator property 505. With this linkage between the Navigator class 508 and the MessageRibbon 507, the MessageRibbon 507 has the ability to navigate to UI elements in the UI Object Hierarchy 509.

When a user views a Message that is associated with a UIElement 502 in the UI Object Hierarchy 509, the MessageRibbon 507 will call the NavigateTo( ) method 506 of the Navigator class 508, passing the UIElement 502 that was associated with the Message. The Navigator class 508 will navigate to the proper UI element and bring it into view for the user to see. Thus, the message ribbon provides a way to navigate through the computer program to the user interface of the computer program that generated the message object.

Figure 5A:
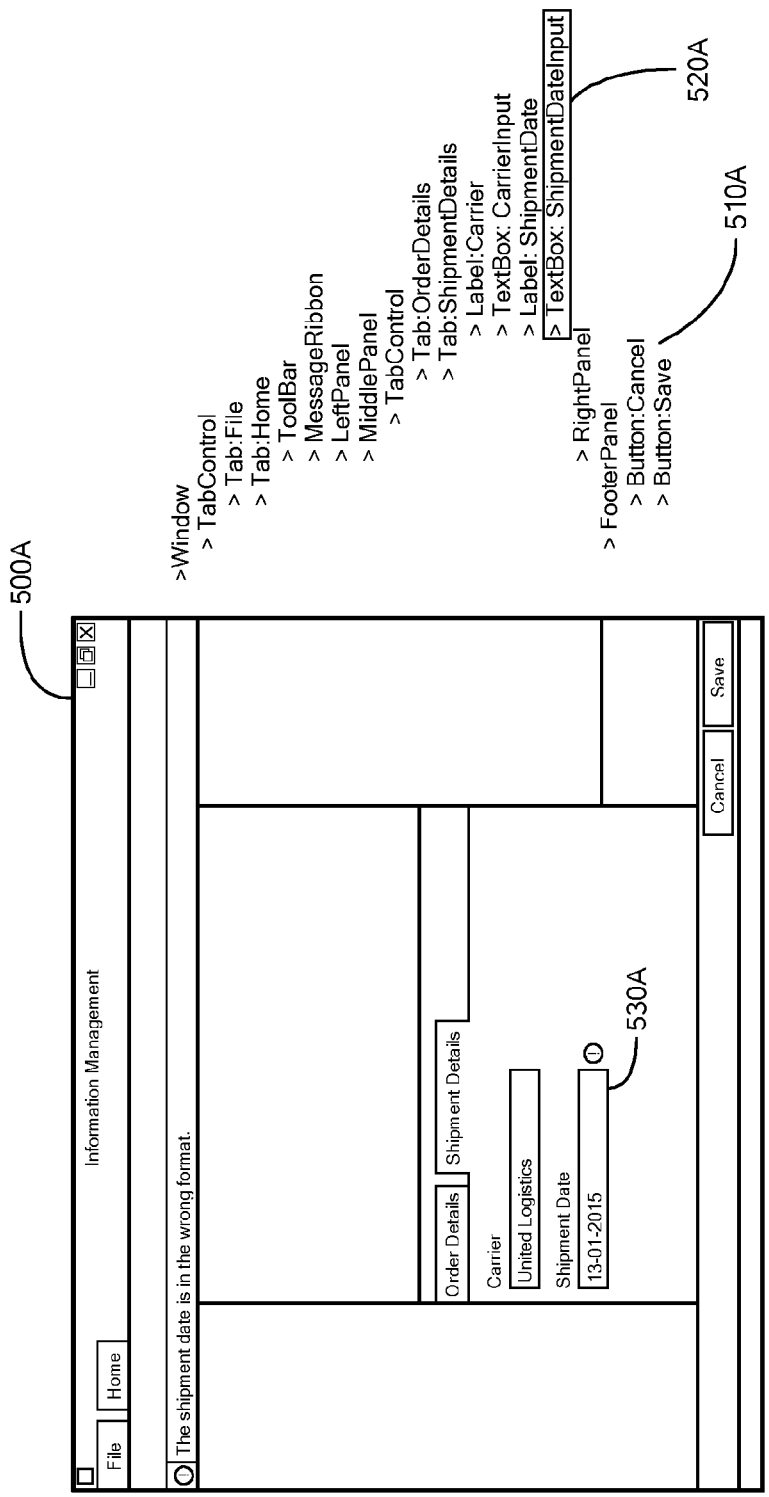
FIG. 5A shows an exemplary user interface for a computer program on and the corresponding object hierarchy.

FIG. 5A shows an exemplary user interface 500A for a computer program on the left and the corresponding object hierarchy 510A on the right. The user interface 500A is represented by an object hierarchy 510A that can vary depending on the operating system and platform. In the example that is shown in FIG. 5A, the Navigation class traverses the object hierarcy until it finds the ShipmentDateInput control 520A, and sets the control to an invalid state. Additionally, the Navigation class will set keyboard focus to the text box 530A. Keyboard focus may be represented by a change in color of the box or highlighting of the text box.

The different types of messages include, error, warning success, information and instruction. If an error message occurs, it is provided to indicate that a problem has already occurred. An error message can be used for data validation or server side validation. If data is entered and is not of the predefined format, an error message may be generated and presented in the message ribbon of the computer program. As an example, a user may be entering information into a form, such as on a web page and may enter a requested percentage without using a decimal place. An error message would be generated from the computer program and the icon associated with the error message would be incremented. Similarly, server side validation may generate an error message when an entire form is being submitted to a server wherein the server indicates that information within the form is incorrect.

In some complex computer programs, data validation can be too complex to be done on the client device as the user is interacting with the user interface. In such a scenario, the input data will be transferred to a server. The data may then undergo complex calculations and then be compared to expected output values in order to validate the data. The server may then send a confirmation to the client device displaying the graphical user interface either confirming the validity of the data or indicating that there is an error in the data. As an example, a user may be validating stress and pressure levels of piping in a 3D model in a CAD/CAM computer program. The user may make changes to the 3D model and indicate to the computer program that the changes should be saved (e.g. clicking on a save button). The data may be transferred to a central server where complex calculations and simulations would be performed to determine the stress and pressure levels. A tolerance may be associated with the piping and if the pressure level is exceeded an error message may be generated and transmitted to the graphical user interface of the client device. The error message would be passed to the message ribbon and the message ribbon would indicate that there is an error that needs to be corrected.

Figure 6A:
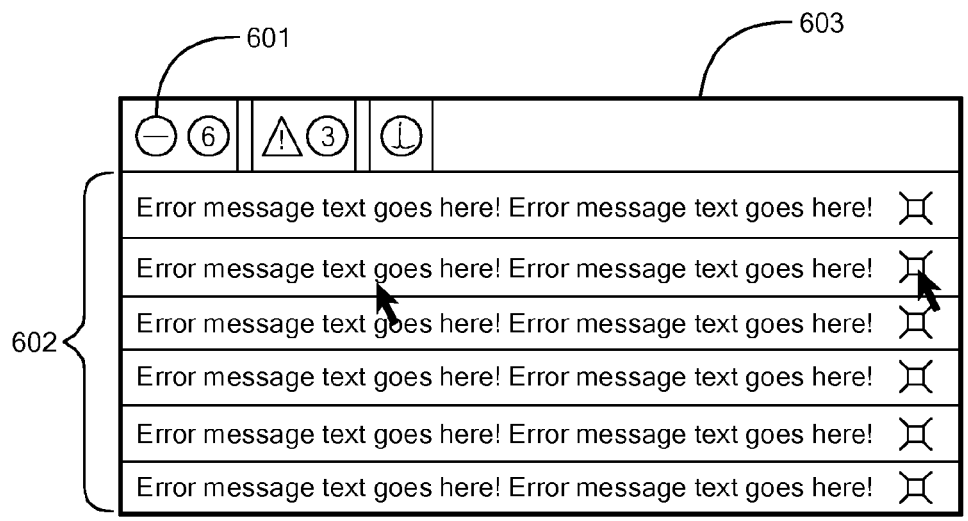
FIG. 6A, shows an exemplary message ribbon in which the error messages are stacked.
Figure 6B:
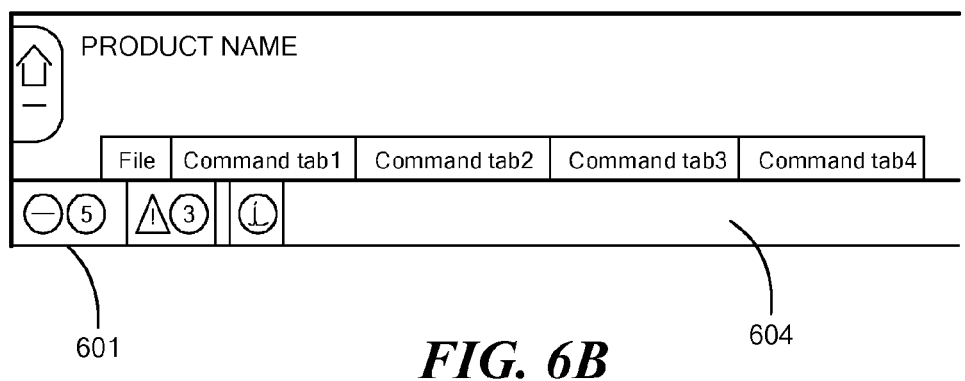
FIG. 6B, shows an exemplary updated message ribbon after selection of one of the error messages in FIG. 6A.

Each message will have its own icon and may have an identifying color associated with the icon. As shown in FIG. 6A, the error messages may be stacked. Wherein upon selection of the error message icon 601, which indicates that 6 error messages are within the queue of the message ribbon and therefore are stacked. The error message text for each error message is presented in a text box 603 upon selection. In FIG. 6A, 6 separate text boxes are presented and the user may select one of the error messages. The message ribbon would redirect the computer program to the graphical user interface associated with the generation of the error message. The user can then correct the error and dismiss the error message in the message ribbon. As shown in FIG. 6B the message ribbon now indicates that there are only 5 error messages and no text is presented in the text box 604.

Figure 7A:
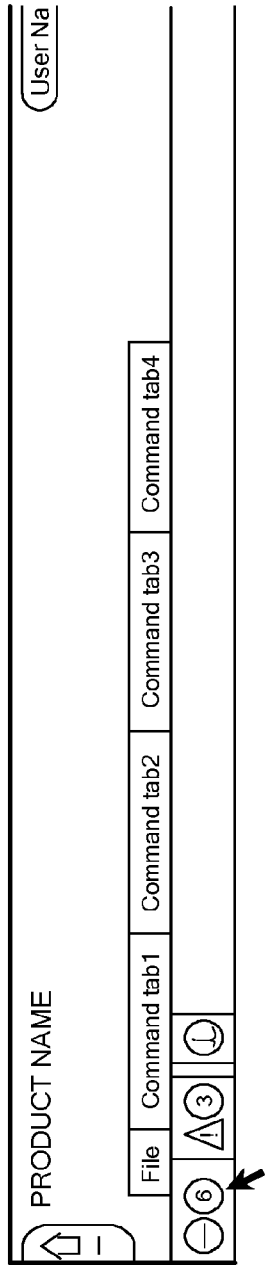
Figure 7B:
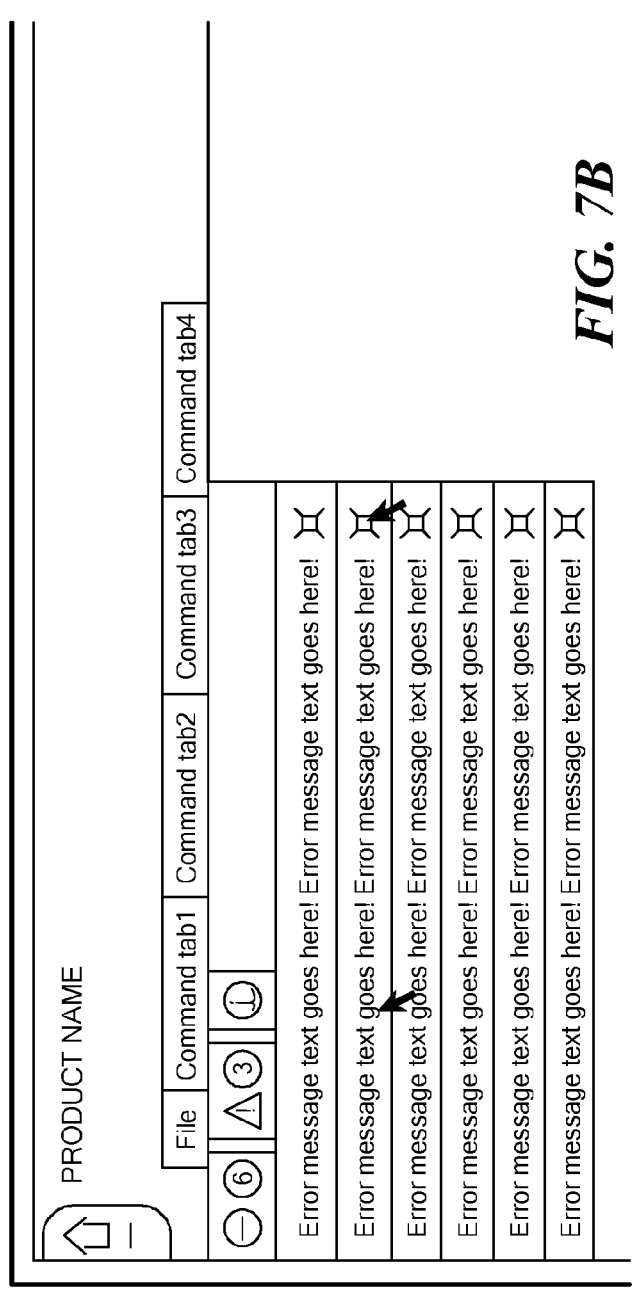
Figure 7C:
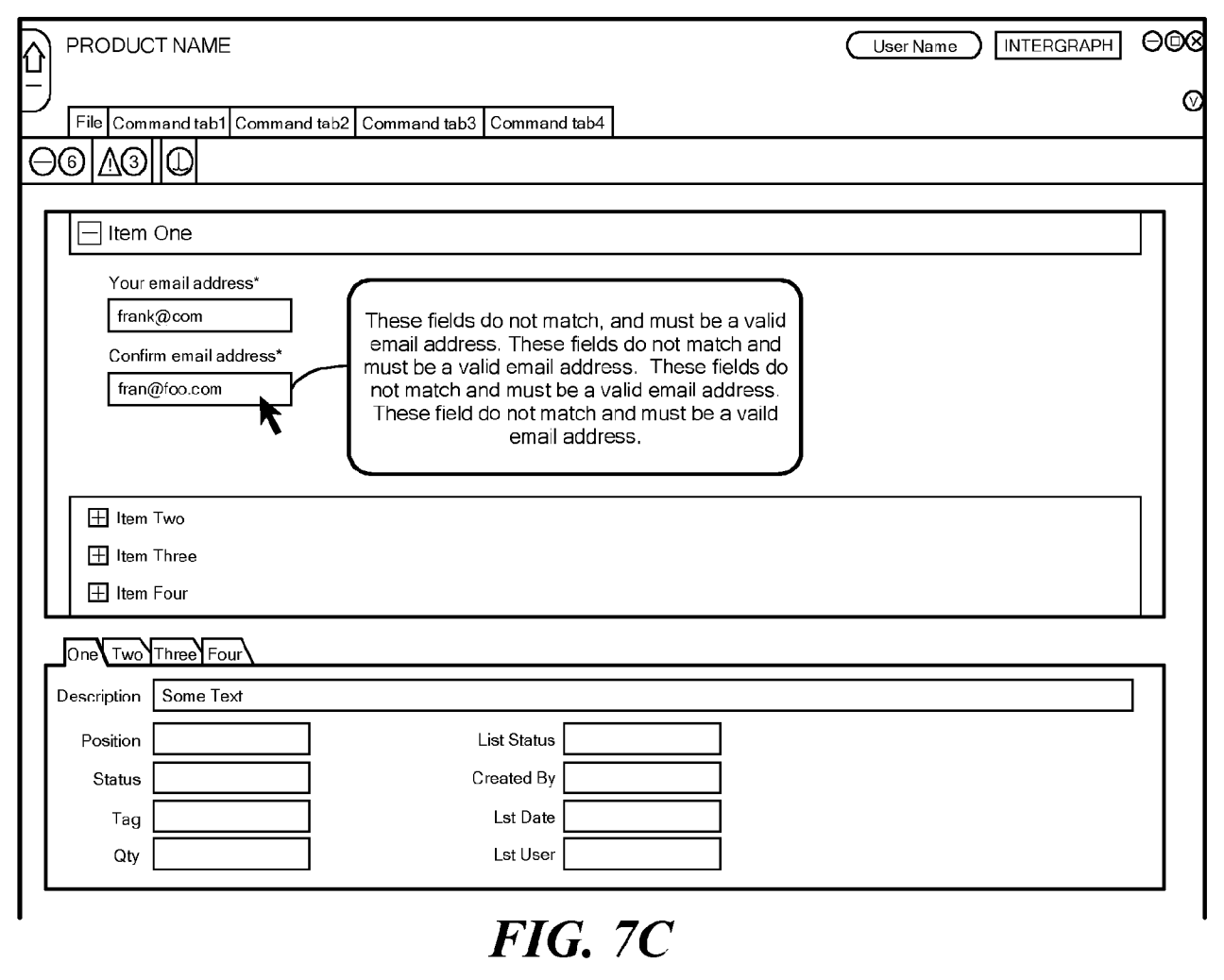

FIGS. 7A-7C show an example of the message ribbon. In FIG. 7A, the message ribbon includes multiple icons for different message types wherein each icon includes a counter for the number of that type of messages. When the user selects the error message icon 701 by clicking on the error message icon using the on screen cursor and an input device, the currently active error messages, which have not been dismissed are presented to the user. The user can then selects an error message to interact with as shown in FIG. 7B. The user again places the cursor over a desired error message and clicks using an input device. The message ribbon interacts with the computer program and the user interface hierarchy through the UINavigator to redirect the user interface to the location within the computer program associated with the error message. As shown in FIG. 7C, the message ribbon redirects the user to an input screen in which a confirmatory e-mail address does not match with the originally entered e-mail address (i.e. the point within the computer program that generated the error message). In addition to redirection, the message ribbon may also provide a text box that provides information about the type of error and how the error may be corrected. It should be recognized by one of ordinary skill that the developer of the computer program can determine where the user will be redirected to in the graphical user interface of the computer program. Additionally, the developer of the computer program using the message ribbon computer programming code can cause other programs (e.g. e-mail program), a script or an add-on computer software module to the computer program to be executed in addition to causing redirection to the graphical user interface associated with the generation or source of the error message. Thus, if an error message is generated in an object associated with a second screen of a graphical user interface, the message ribbon application may direct the user to the first screen of the graphical user interface based upon convenience and best practices. It should be understood by one of ordinary skill in the art, that the developer, when using the message ribbon computer programming code can determine where within the computer code that the user will be redirected and is not solely limited to redirecting the user to the location within the computer code or the graphical user interface of the computer program that generated the message.

FIG. 9 shows an exemplary computer system with distribution of a message to a plurality of users of a complex computer program based upon the generation of a message by a message object. In FIG. 9, a user 910 is operating on a client device 920 and has accessed a complex 3D graphics program and a workflow project of a shared 3D model. The user 910 makes a change to the shared 3D model on the client device 920. For example, the user 910 may input data into a form indicating that a parameter should be increased from 2 m to 2.5 m. The change(s) made by the user 910 are sent from the client device 920 to the application server 930 for validation. The application server 930 validates the user's changes, which causes an error to be generated (e.g. the newly entered/changed parameter exceeds a tolerance or a value is above or below a threshold). The error message is then distributed to all users that are connected to the application server 930 that are actively working on the shared 3D model. At the client device 940 of a second user 950, the error message is presented in a message ribbon. The second user can select the message in the message ribbon and the computer program on the client device will be redirected to a graphical user input screen associated with the error. As shown in FIG. 9, the second user is directed to the 3D model and the pipe that had its parameter changed from 2 m to 2.5 m is highlighted indicating that there is an error associated with the pipe. It should be recognized that the second user might choose to continue working on the 3D model without the need to view the error message, as the error message is a non-fatal error message. Thus, the user has control over when and whether the user will view the error message.

FIG. 8 shows an exemplary screen from a computer program wherein the message ribbon has redirected the user the graphical user interface associated with the error message in accordance with FIG. 7C. In this example, the message pop-up includes the property of having its placement changed by the end user by dragging the pop-up window. In this example, the pop-up window has been dragged to the right side of the screen away from the input area that reflect the error (i.e., the e-mail entry and confirmation windows). Given that the pop-up message is generated as part of the message ribbon computer code the user may cycle through errors and be redirected within the computer program. As shown in FIG. 8, a user may select "<" to move to the error that precedes the current error and the user will be redirected to the graphical user interface of the computer program associated with the previous error. Similarly, a user may select ">" to move to the next error message within the listing of stacked message. In general, the messages will be stacked according to the time the message was received by the message ribbon. In other embodiments, the ordering of the messages in the stack may be based on some other criteria or variable. For example, error messages may have an associated priority number and therefore, an error message with a higher priority number will be placed at the top of the stack. In another example, in a complex computer program, users may be grouped together as a team and a message that is generated as the result of another member of the team may be given higher priority and be placed in the stack accordingly.

Warning messages alert a user to a condition that might cause a problem in the future. Warning messages makes the user aware of a condition or potential problem, but the user need not immediately address the potential problem. For example, a warning message may arise in a 3D-CAD application that dynamically calculates stresses and pressures of pipes as they are added to a 3D model. The application may generate warnings about simulated stresses and pressures that may or may-not be correct and outside of a threshold level. The warning message is then distributed and populated on the message ribbon of each user actively interacting with the application. It is then, up to the user/engineer to evaluate the warnings and determine if they should be acted upon or whether the warning can be ignored.

Information messages are simply statements of fact that convey a pertinent message related to the user's current activity, workflow, or group. In one embodiment of the invention, the message ribbon contains an information icon and when an information message is received, the information message is automatically displayed in a text box associated with the message ribbon. A user can dismiss the information message by selecting a dismiss icon such as the tradition "X" icon. A success message delivers information about an action or a condition that has completed successfully within the computer program of complex computer program. For example, a success message may inform a user that their work has been successfully saved. ("Your document, SalesResults2015 was successfully saved"). Another type of message is the instruction message. An instruction message is associated with the current workflow of the user. The instructional message assists and guides the user through one or more steps in a task. The message would appear in the text portion of the message ribbon. This type of message may only be dismissed once the user has completed the task for which the instruction is presented. Thus, the message is automatically dismissed based upon completion of the task and does not require any user interaction to dismiss an instructional message from the message ribbon.

In one embodiment of the invention, stacking certain message types does not occur so that there is only a current message of that type. Informational, success, and instructional messages, typically can be limited to a single message wherein the message will be dismissed and replaced by a more currently received message of the specific message type (i.e. informational, success, or instructional).

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICS or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the card processing devices, image capturing devices, and backend processing systems described herein) are necessarily non-conventional because, absent special programming or configuration, the conventional components do not inherently perform the described non-conventional methods.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer program product having a non-transitory computer readable medium with computer code thereon for use with a computer processor for producing a non-modal graphical user control element as part of a ribbon for use within an application program providing real-time status information about the application program, the computer code comprising:
   computer code for producing the non-modal graphical user control element on a ribbon graphically displayed within the application program;
   computer code for receiving from the application program a status message of a predefined application specific category and visually placing the status message in real-time on the non-modal graphical user control element at a location associated with the predefined application specific category;
   computer code for receiving application specific position information associated with the status message, the application specific position information identifying an object associated with one of a plurality of graphical user interfaces within the application program; and
   computer code, responsive to user selection of the non-modal graphical user control element at the location for the predefined application specific category, causing the application program to switch to code within the application program associated with the object identified by the application specific position information.

2. A computer program product according to claim 1, wherein the application specific position information may be identification of an object within the application program that generated the status message.

3. A computer program product according to claim 1, wherein causing the application program to switch to code associated with the application specific position information causes the presentation of a graphical user interface associated with application specific position information.

4. A computer program product according to claim 1, wherein the application specific position information identifies a parameter associated with the object.

5. The computer program product according to claim 1, further comprising:
   computer code for producing a second non-modal graphical user control element within the application program for a second predefined category wherein the first and the second non-modal graphical user control elements form a ribbon.

6. The computer program product according to claim 1, wherein the real-time status information is indicative of an error or a warning within the application program, but does not stop execution of the application program.

7. The computer program product according to claim 1, wherein upon receiving a second real-time status message within a predefined category, a new graphical user control element is visually presented stacked on the first real-time status message within the predefined category.

8. The computer program product according to claim 7, further comprising:
   computer code responsive to user interaction for moving between stacked status messages within the predefined category.

9. The computer program product according to claim 1, wherein the status message is removed from the non-modal graphical user control element after a predefined time period.

10. The computer program product according to claim 1, wherein the status message is removed from the non-modal graphical user control element after occurrence of an event in the application.

11. The computer program product according to claim 1, wherein the application is a complex computer program having a plurality of projects each project associated with project data and the computer program product further includes computer code for identifying the status message according to a project and only displaying status messages if a user is working on the project.

12. The computer program product according to claim 1, wherein the category of the status message is either an error message, a warning message, a success message, or an instruction message.

13. The computer program product according to claim 1, wherein the status message is an error message indicating that an error in the application program has already occurred.

14. The computer program product according to claim 10 wherein the error message is indicative of a data validation error.

15. A computer-implemented method for producing a non-modal graphical user control element as part of a ribbon for use within an application program providing real-time status information about the application program in a client server architecture, the method comprising:

producing on a client device the non-modal graphical user control element on a ribbon graphically displayed within the application program on the client device;

receiving at the client device from the application program operating on the server a status message of a predefined application specific category and visually placing the status message in real-time on the non-modal graphical user control element at a location associated with the predefined application specific category;

receiving application specific position information associated with the status message, the application specific position information identifying an object associated with one of a plurality of graphical user interfaces within the application program;

in response to user selection of the non-modal graphical user control element at the location for the predefined application specific category, causing the application program to switch to code within the application program associated with the object identified by the application specific position information.

16. A computer-implemented method according to claim 15, wherein the application specific position information may be identification of an object within the application program that generated the status message.

17. A computer-implemented method according to claim 15, wherein causing the application program to switch to code associated with the application specific position information causes the presentation of a graphical user interface associated with application specific position information on the client device.

18. A computer-implemented method according to claim 15 wherein the application specific position information identifies a parameter associated with the object.

19. A computer-implemented method according to claim 15 further comprising:

producing on the client device a second non-modal graphical user control element within the application program for a second predefined category wherein the first and the second non-modal graphical user control elements form a ribbon.

20. A computer-implemented method according to claim 15 wherein the real-time status information is indicative of an error or a warning within the application program, but does not stop execution of the application program on the client device.

21. A computer-implemented method according to claim 15, wherein upon receiving a second real-time status message within a predefined category, a new graphical user control element is visually presented stacked on the first real-time status message within the predefined category on the client device.

22. A computer-implemented method according to claim 21 further comprising:

responsive to user interaction selecting between stacked status messages within the predefined category so that the selected stacked status message is presented on the graphical user interface on the client device.

23. A computer-implemented method according to claim 15 further comprising removing a message from the non-modal graphical user control element after occurrence of an event in the application.

* * * * *